Figures 1, 2:
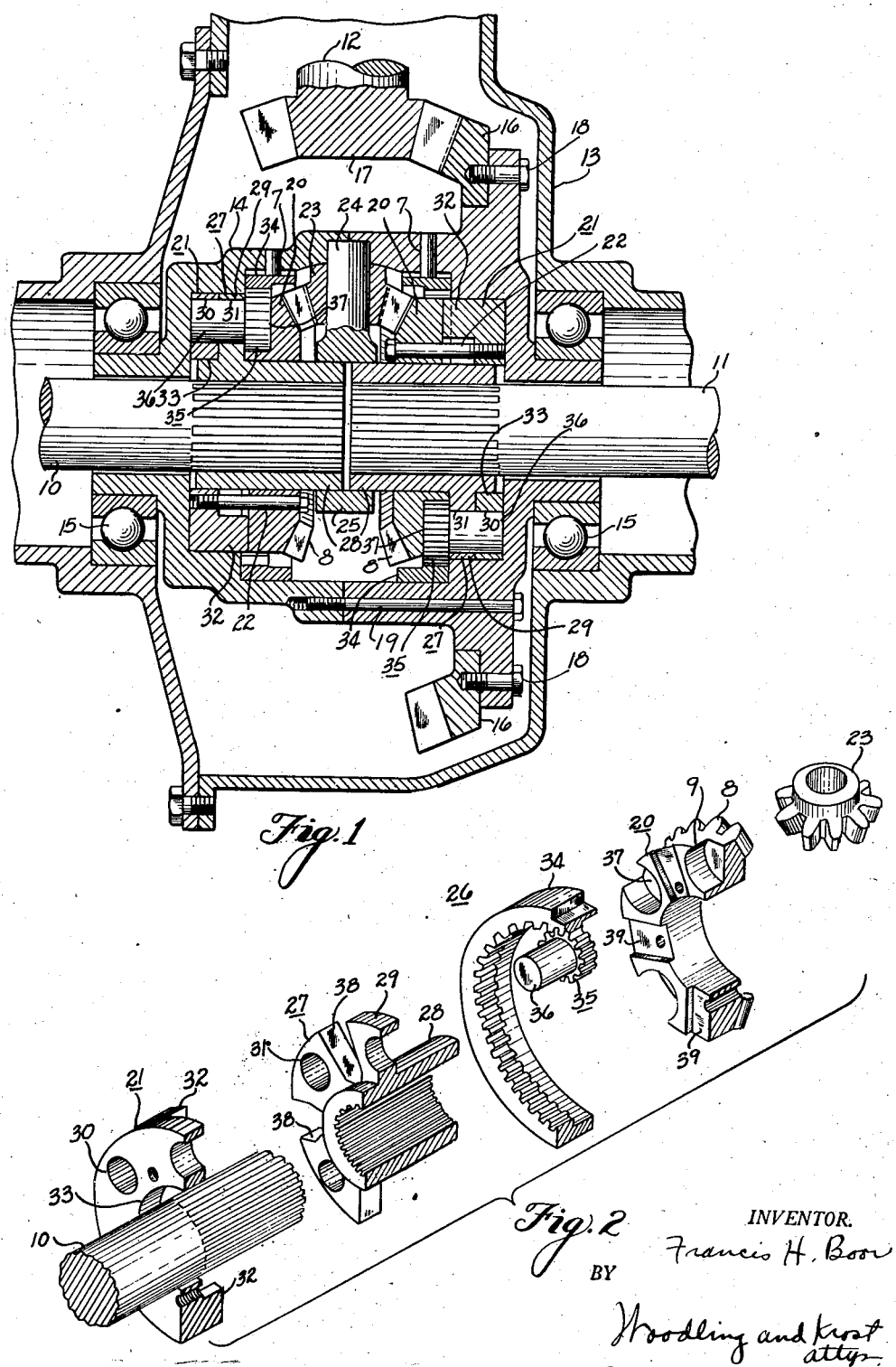

July 31, 1945.  F. H. BOOR  2,380,397
DIFFERENTIAL MECHANISM
Filed May 29, 1944

INVENTOR.
Francis H. Boor
BY
Woodling and Krost
attys.

Patented July 31, 1945

2,380,397

UNITED STATES PATENT OFFICE 2,380,397

DIFFERENTIAL MECHANISM

Francis H. Boor, La Fayette, Ind., assignor to Fairfield Manufacturing Company

Application May 29, 1944, Serial No. 537,885

7 Claims. (Cl. 74—315)

My invention relates in general to differential mechanisms and more particularly to a differential mechanism having the provision of resisting the rotation of the differential gears against differential movement when the power transmitted to the differential gears tends to spin one of the axles with relation to the other.

An object of my invention is the provision of a differential gearing which generally conforms to the conventional embodiment of a differential mechanism but which includes additional means for resisting the differential gears against differential movement when the power transmitted to the differential gears tends to spin one of the axles with relation to the other.

Another object of my invention is the provision of retaining the good and efficient features of a conventional differential mechanism and of providing in addition thereto the arrangement of resisting the differential gears against differential movement when the power transmitted to the differential gears tends to spin one of the axles with relation to the other.

Another object of my invention is the provision of a differential of the above specified type which is rugged in construction and which will withstand a considerable amount of hard usage.

Another object of my invention is the provision of mounting my improved feature which resists the differential gears against differential movement upon either one or both sides of the differential mechanism.

Another object of my invention is the provision of mounting the new feature of my invention which resists the differential gears against differential movement upon one side of the differential mechanism only and thereby allowing a saving of cost in manufacture.

Other objects and a fuller understanding of my invention may be had by referring to the following description and claims, taken in conjunction with the accompanying drawing, in which:

Figure 1 represents a cross-sectional view of a differential mechanism embodying the features of my invention; and Figure 2 is a perspective and expanded view of the cooperating parts of my differential mechanism.

With reference to Figures 1 and 2 of the drawing, my invention is arranged to drive two axle 10 and 11 by means of a power driven shaft 12. The entire differential mechanism is rotatively mounted within a housing 13 upon ball bearings 15. The differential case is designated by the reference character 14 and is arranged to be rotated or driven upon the ball bearing 15 by means of a ring gear 16 which meshes with a drive pinion 17 upon the power driven shaft 12. The ring gear 16 may be fastened to the differential case 14 in any suitable manner such, for example, as illustrated by bolts 18. The differential case 14 may be constructed in two parts and, as illustrated, the two parts are secured together by means of bolts 19.

Centrally positioned within the differential case 14 is a spider core ring 25 having radially extending spider shafts 24 upon which are rotatively mounted spider pinions 23. The construction of the spider core ring 25, the spider shafts 24 and the spider pinions 23 are substantially in accordance with those found in conventional differential mechanisms.

As illustrated in Figure 1, compensating gears 26 are mounted within the differential case 14 upon opposite sides of the spider pinion 23. Each compensating gear is composed of three parts, namely: a first body part 20, a flanged and splined part 27, and an end supporting part 21. The arrangement for the left-hand side of the differential mechanism as shown in Figure 1 is diagrammatically shown in Figure 2 which is helpful in understanding the operation of my differential mechanism. The component parts of the compensating gear 26 may be held together by bolts such as bolts 22 shown in Figure 1.

With reference to Figure 2, the first body part 20 has a series of bearing sockets 37 located circumferentially about the periphery thereof, and is provided with teeth 8 with which the compensating gear 26 is engaged by spider pinion gears 23. Notches 39 are provided to form interlocking contact with the end supporting part 21. The walls of the bearing sockets 37 are disposed to intersect the outer surface 9 of the body part 20.

The flanged and splined part 27, as shown in Figure 2, is provided with a central hub portion 28 upon which the first body part 20 is mounted as shown in Figure 1. The flange 29 of the flanged part 27 is notched as at 38 to provide interlocking contact with the parts 20 and 21, and has bearing openings 31 therethrough.

The end supporting part 21 is disk-like in form and is provided with bearing openings 30. The part 21 has interconnecting projections 32 which extend through the notches 38 of the flanged part 27 and into the notches 39 of the first body part 20. A central opening 33 is provided whereby the end supporting part 21 may be mounted upon the hub 28 of the flanged part 27. The central opening 33 is of the same diameter as the outside surface of the hub portion 28 of flanged portion 27, and is arranged to fit thereon.

When the compensating gear 26 is assembled and mounted within the differential case 14, the flanged part 27 is splined to the axle 10, the first body part 20 is mounted upon the hub 28 of the flanged part 27 with the teeth of the body part 20 positioned to intermesh with the teeth of the drive pinion 23, and the end support part 21 is also mounted upon the hub portion 28 of the flanged part 27 but is on the side of the flange opposite the first body part 20. When the compensating gear 26 is assembled as described, the centers of the bearing openings of the parts 21 and 27, and the centers of the bearing sockets of the first body part 20, are in substantial alignment.

The cooperating parts of the compensating gear 26 of my mechanism operate the same as that of a conventional differential mechanism. However, in a differential mechanism constructed according to my invention, the compensating gear 26 is coupled to the case 14 by additional gearing means composed of at least an internal gear 34 and intermeshing pinion gears 35. The intermeshing pinion gears 35 are provided with stub shafts 36. The stub shafts 36 may be integrally connected to the pinion gears 35 or may be used merely as guiding means to prevent misalignment of the pinion gears 36 in the bearing sockets. The outside diameters of parts 21 and 27 are slightly less than the inside diameter of the internal teeth in the internal gear 34. This will enable compensating gears 26, to be assembled or disassembled without interference with ring gear 34.

The internal gear 34 is nonrotatively connected to the differential case 14 by any suitable means such, for example, as by a locking pin 7 secured in the differential case 14 and fitting into a slot provided in the peripheral surface of the internal gear 34. The intermeshing pinion gears 35 are positioned within bearing sockets 37 of the body part 20. It is noted from Figure 1 that the radial distance to the outside point of the intermeshing pinion gears 35 is greater than the radial distance to the outside surface 9 of the main body part 20, whereby the teeth of the intermeshing pinion gears 35 extend beyond the surface 9 of the main body part 20. Extending from each of the intermeshing pinion gears 35, the short stub shaft 36 passes through the opening 31 of the flanged part 27 and extends into an opening 30 of the end support 21. The internal gear 34 is secured to the case 14 as described and is positioned so that the teeth of the intermeshing pinions 35 are meshed with the teeth thereof. For the purpose of my invention any suitable number of intermeshing pinions 35 may be provided.

In operation, when the wheels that are driven by the axles 10 and 11 have substantially the same traction, my differential mechanism operates the same as that of the conventional differential mechanism, in that the power from the power driven shaft 12 is transmitted through the drive pinion 17 to the ring gear 16, the differential case 14, the spider shafts 24, the spider pinions 23, and through the compensating gears 26 connected to each of the axles 10 and 11 by splined flange part 27. Let it be noted here that there is not relative movement between the drive pinions, compensating gears and power driven case in either conventional differential mechanisms or in differential mechanisms defined according to my invention whenever both axles turn at equal speeds.

In explaining the operation of the additional gear means in my differential mechanism when the differential movement of the differential gears is arrested or resisted, let it be assumed that the axle 10 tends to spin with reference to the axle 11. Under this assumed condition the compensating gear 26 on the left-hand side of the differential mechanism tends to turn at a greater speed than that of the differential case 14 and the internal gear 34 which is non-rotatively connected thereto. In other words, relative movement tends to exist between the compensating gear 26 and the internal gear 34. In order that this relative movement between the compensating gear 26 and the internal gear may take place, the pinion gear must rotate. The rotation of the gear pinions 35 is resisted because of the friction between the teeth surfaces and the bearing walls of the bearing sockets 37. The amount of resistance to rotation of the pinions 35 may be increased by integrally connecting the stub shafts 36 to the pinions 35. The shafts 36 will then also resist rotation because of the friction between the shafts and the bearing openings 30 and 31. The resistance to rotation of the pinions 35 is relatively great because of the large amount of sliding bearing surface. In ordinary use of my differential mechanism there is only a small amount of relative movement between the compensating gear 26 and the case 14, consequently the amount of turning of the intermeshing pinion gears 35 in the bearing sockets 37 is small. However, whenever the axle 10 tends to spin in relation to axle 11 the amount of turning of the pinion gears 35 in the bearing sockets 37 is greatly increased over the amount encountered in ordinary use. It is a well known fact that increasing speed of relative movement of two surfaces in frictional contact, such as the surfaces of the pinions 35 and the stub shafts 36 with their respective bearing surfaces, is accompanied by a greatly increased resistance between the surfaces. Therefore, when the axle 10 tends to spin with reference to the axle 11 a large frictional resistance is set up to resist the rotation of the intermeshing pinion 35. It is noted that the diameter of the intermeshing pinion gear 35 is small in comparison to the diameter of the internal gear 34. Therefore, a small amount of frictional resistance to the rotation of the pinion gear 35 is effective in producing a large resisting torque to relative movement between the compensating gear 26 and the driving case 14. This large frictional resistance against rotation of the pinion 35 tends to prevent the compensating gear 26 from turning, which means that the compensating gear is mechanically secured to the differential case 14. The mechanically securing of the compensating gear 26 on the left-hand side of the differential mechanism to the differential case 14 resists the rotation of the spider pinions 23 in which case power is transmitted to the axle 11 for driving same even though the wheel driven by the axle 10 is encountering substantially no traction. The combination of compensating gear and additional gearing means described may be placed on just one side of the driving pinions 17 if desired. However, if one is placed on both sides of the pinions 17 a similar but reverse directional action takes place between the compensating gear 26 on the right-hand side of the differential mechanism and the differential case 14. Thus, for example when the axle 10 tends to spin with reference to the axle 11, there is a tendency for relative movement between the compensating gear 26 and the internal gear 34 on the right-hand side of the differential mechanism, but the tendency for this relative movement is in the reverse direction to the direction of rotation of the compensating gear 26 on the left-hand side of the differential case. This tendency of relative movement in the reverse direction mechanically ties the compensating gear 26 on the right-hand side of the differential mechanism to the differential case, which means that the differential case 14 aids also in driving the axle 11 through the internal gear 34 and the pinion gear 35.

Thus, the combination of the internal gear 34, the pinion gear 35, and the stub shaft 36 on both sides of the differential mechanism tends to aid in causing the rotation of the differential case 14 to drive the axle 11 when the axle 11 tends to spin. Accordingly, I obtain a double locking or arresting action against differential movement when the power transmitted to the differential gears tends to spin one of the axles with relation to the other. The locking or arresting action may be also varied by changing the number of stub shafts and pinion gears. Also, the effectiveness of the locking or arresting action may be greatly increased by making the diameter of the pinion gears 35 small in order to reduce the torque transmitted from the pinion gears 35 to the stub shafts 36. The pinion gears 35 and the stub shafts 36 may be made of one integral piece of metal with the teeth directly cut into the piece of metal.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter described.

I claim as my invention:

1. In a differential mechanism arranged to drive a pair of axles having splines at the end thereof, a power driven case, differential gearing means including a spider core ring, spider pinions carried thereby, and a pair of side compensating gears, the compensating gears each comprising a first body part, a flanged and splined end part, and an end supporting part, all parts of the said compensating gear being nonrotatively connected one with the other, the first body part of each compensating gear having teeth to intermesh with the said spider pinions and having bearing surfaces provided at intervals about the periphery thereof, the said end supporting part of each compensating gear being spaced respectively from the first body part of each compensating gear and having bearing surfaces, the said flanged and splined part being provided with bearing surfaces and being disposed between the first body part and the end supporting part and being nonrotatively connected thereto, said bearing surfaces of said parts being in substantial alignment, the splines of the flanged part of the compensating gear intermeshing with splines of an axle whereby the compensating gears are disposed to differentially drive the axles, and one set of additional gear means disposed on each side of the spider pinion for respectively interconnecting the side compensating gears to the said case to oppose differential movement when the power transmitted to the differential gearing means tends to spin one of the axles relative to the other axle, each set of additional gear means including an internal gear secured to the case and intermeshing pinion gear means comprising a pinion gear with a stub shaft connected thereto, the teeth of the intermeshing pinion gear fitting into a bearing surface of one of the parts of the compensating gear and intermeshing with the internal gear, and the stub shaft of the intermeshing pinion gear passing therefrom and through the bearing surfaces of the other parts.

2. In a differential mechanism arranged to drive a pair of axles, a power driven case, differential gearing means including a spider core ring, spider pinions carried thereby, and side compensating gears having bearing sockets provided at intervals about the periphery thereof and being coupled to the axles to differentially drive the axles, and a set of additional gearing means disposed to respectively interconnect the side compensating gears to the said case, each set of said additional gearing means including an internal gear secured to the case and intermeshing pinion gears disposed within the said bearing sockets of one of the compensating gears and engaging the teeth of the internal gear of the set, the teeth of the said pinion gears serving as bearing surfaces for the pinions to contact the said compensating gears.

3. In a differential mechanism arranged to drive a pair of axles, a power driven case, differential gearing means including a spider core ring, spider pinions carried thereby, and side compensating gears having bearing sockets provided at intervals about the periphery thereof and being coupled to the axles to differentially drive the axles, and a set of additional gearing means disposed to respectively interconnect the side compensating gears to the said case, each set of said additional gearing means including an internal gear secured to the case and intermeshing pinion gears engaging the teeth of the internal gear, said pinion gears of each set being bearinged in the said bearing sockets of the compensating gears in which they are mounted.

4. In a differential mechanism arranged to drive a pair of axles, a power driven case, differential gearing means including a spider core ring, spider pinions carried thereby, and side compensating gears having bearing sockets provided at intervals about the periphery thereof and being coupled to the axles to differentially drive the axles, and a set of additional gearing means disposed to respectively interconnect the side compensating gears to the said case, each set of said additional gearing means including an internal gear secured to the said case, and intermeshing pinion gears being bearinged in the said bearing sockets of the compensating gears and engaging the teeth of the internal gear of the set, the said side compensating gears having a support part with bearing openings therethrough, each of the said intermeshing pinion gears having a stub shaft connected thereto and extending into the bearing openings of the said support part of the side compensating gear in which it resides.

5. In a differential mechanism arranged to drive a pair of axles, a power driven case, differential gearing means coupled to the axles and including at least a pair of side compensating gears and spider pinions arranged to drive the axles, at least one of the said side compensating gears being composed of at least a first body part having bearing sockets provided about the periphery thereof and having teeth to intermesh the said spider pinions, an end supporting part having bearing openings therethrough, and a flanged and splined part having bearing openings therethrough and being disposed between the said first body part and the flanged and splined part of the said at least one of the compensating gears, the said first body part and the end supporting part having means to nonrotatively connect one with the other and having surfaces disposed to interlock with the said flanged and splined part and cause the said flanged and splined part to be nonrotatively connected thereto, and additional gearing means including an internal gear secured to the power driven case and intermeshing pinion gears each provided with a stub shaft connected thereto, the teeth of said pinion gears being bearinged in the said bearing sockets of the at least one of the compensating gears with the teeth of the pinion gears intermeshing with the teeth of the internal gear and the stub shaft extending therefrom through the bearing openings of the said flanged and splined part and extending into the openings of the said end supporting part of the at least one of the compensating gears which serves as a second supporting means for the said pinion gears to prevent misalignment of the pinion teeth in the sockets of the first body part.

6. In a differential mechanism arranged to drive a pair of axles, a power driven case, differential gearing means including a spider core ring, spider pinions carried thereby, and side compensating gears arranged to differentially drive the axles, at least one of the compensating gears being provided with bearing sockets at intervals about the periphery thereof, and additional gearing means disposed to interconnect the said at least one of the side compensating gears to the case, the said additional gearing means including an internal gear secured to the case and intermeshing pinion gears bearinged in the said bearing sockets of the said at least one of the compensating gears and engaging the teeth of the internal gear.

7. In a differential mechanism arranged to drive a pair of axles, a power driven case, differential gearing means including a spider core ring, spider pinions carried thereby, and side compensating gears arranged to differentially drive the axles, at least one of the compensating gears being composed of three body parts, the first body part being provided with bearing sockets at intervals about the periphery thereof and having teeth to intermesh with the said spider pinions, the second body part having means by which it may be secured to one of the said axles and having bearing openings at intervals about the periphery thereof, and the third body part also being provided with bearing sockets at intervals about the periphery thereof, all three body parts of the said side compensating gear being disposed to be nonrotatively interconnected one with the other, and additional gearing means disposed to interconnect the said at least one of the side compensating gears to the case, the said additional gearing means including an internal gear secured to the case and intermeshing pinion gears bearinged in the said bearings of at least one of the three parts of the said at least one of the compensating gears and engaging the teeth of the internal gear.

FRANCIS H. BOOR.